United States Patent [19]
Klein

[11] Patent Number: 5,754,856
[45] Date of Patent: May 19, 1998

[54] MVS/ESA MESSAGE TRANSPORT SYSTEM USING THE XCF COUPLING FACILITY

[75] Inventor: Paul Klein, Thousand Oaks, Calif.

[73] Assignee: Candle Distributed Solutions, Inc., Santa Monica, Calif.

[21] Appl. No.: 521,558

[22] Filed: Aug. 30, 1995

[51] Int. Cl.$^6$ .................................................. G06F 13/14
[52] U.S. Cl. .................. 395/680; 395/670; 364/281.3; 364/286
[58] Field of Search ........................... 395/561, 182.02, 395/680, 670; 364/281.3, 230, 286

[56] References Cited

U.S. PATENT DOCUMENTS

| | | |
|---|---|---|
| 4,423,414 | 12/1983 | Bryant et al. . |
| 4,630,196 | 12/1986 | Bednar, Jr. et al. . |
| 4,800,488 | 1/1989 | Agrawal et al. . |
| 5,036,459 | 7/1991 | den Haan et al. . |
| 5,133,053 | 7/1992 | Johnson et al. . |
| 5,329,619 | 7/1994 | Page et al. . |
| 5,471,609 | 11/1995 | Yudenfriend et al. ............ 395/182.02 |
| 5,574,917 | 11/1996 | Good et al. ............................ 395/561 |

*Primary Examiner*—Lucien U. Toplu
*Assistant Examiner*—Majid A. Banankhah
*Attorney, Agent, or Firm*—Merchant, Gould, Smith, Edell, Welter & Schmidt

[57] ABSTRACT

An asynchronous transport mechanism is provided for use between two or more MVS/ESA tasks on the same or different platforms using the IBM XCF facility, a global directory and a message queuing if tasks are not currently waiting for the messages arrival.

A message sending task specifies a named task, which is the name of a group comprised of one or more interested message receiving tasks, that can have access to the message. The sending task is not aware of the number of receiving tasks and is only responsible for registering with a global directory and sending a single message. The message receiving task is not aware of the number of sending tasks and is only responsible for registering with a global directory and receiving a message.

Two messaging options are provided to allow the task to emulate two popular types of functions. The first option allows messages to be mirrored to two or more tasks for reliability. If one task abnormally terminates the others will have duplicate data and hence continue processing without interruption. Option two allows one task to receive all the messages until it terminates. A second named task that has been in standby mode would then automatically pick up the messages and takeover processing without any message loss.

15 Claims, 1 Drawing Sheet

MVS/ESA MESSAGE TRANSPORT SYSTEM USING THE XCF COUPLING FACILITY

BACKGROUND OF THE INVENTION

Conventional MVS systems use the following techniques for transferring messages between tasks: Memory queues, Network transport, Shared datasets. Memory queues work only when the tasks reside on the same physical machine. Shared datasets require the physical machines to have access to the same physical DASD device. Network transports require complex protocols and handshaking which puts the burden of network knowledge on the tasks and networks use lots of computer and network resources. In addition, these techniques are synchronous which causes tasks to wait while the messages are being processed. What is needed is an improved technique for transferring messages without these limitations.

SUMMARY OF THE INVENTION

In accordance with the present invention the native IBM XCF facility available in MVS/ESA is used as an asynchronous transport mechanism between MVS tasks which may reside on the same or different physical machines as long as they reside in a MVS SYSPLEX configuration. Each MVS task registers itself by name in a common global directory. Messages sent from a first MVS task are evaluated to determine eligible recipient tasks from the directory. Each message is sent via the XCF facility to each of the eligible recipient tasks. Each recipient task includes a receiving module for receiving and queuing the messages and notifying the task that the message has arrived. This technique provides fast and low overhead transport common to tasks on the same or different platforms. Also, the invention includes the ability to mirror the message to multiple named tasks from a single source task transparently to the source task. Further, the message may be sent to the first named task in a group of eligible tasks so that when a task becomes inactive the message is sent to the next task in the directory with the same name automatically.

DETAILED DESCRIPTION OF THE DRAWING

Figure 1:
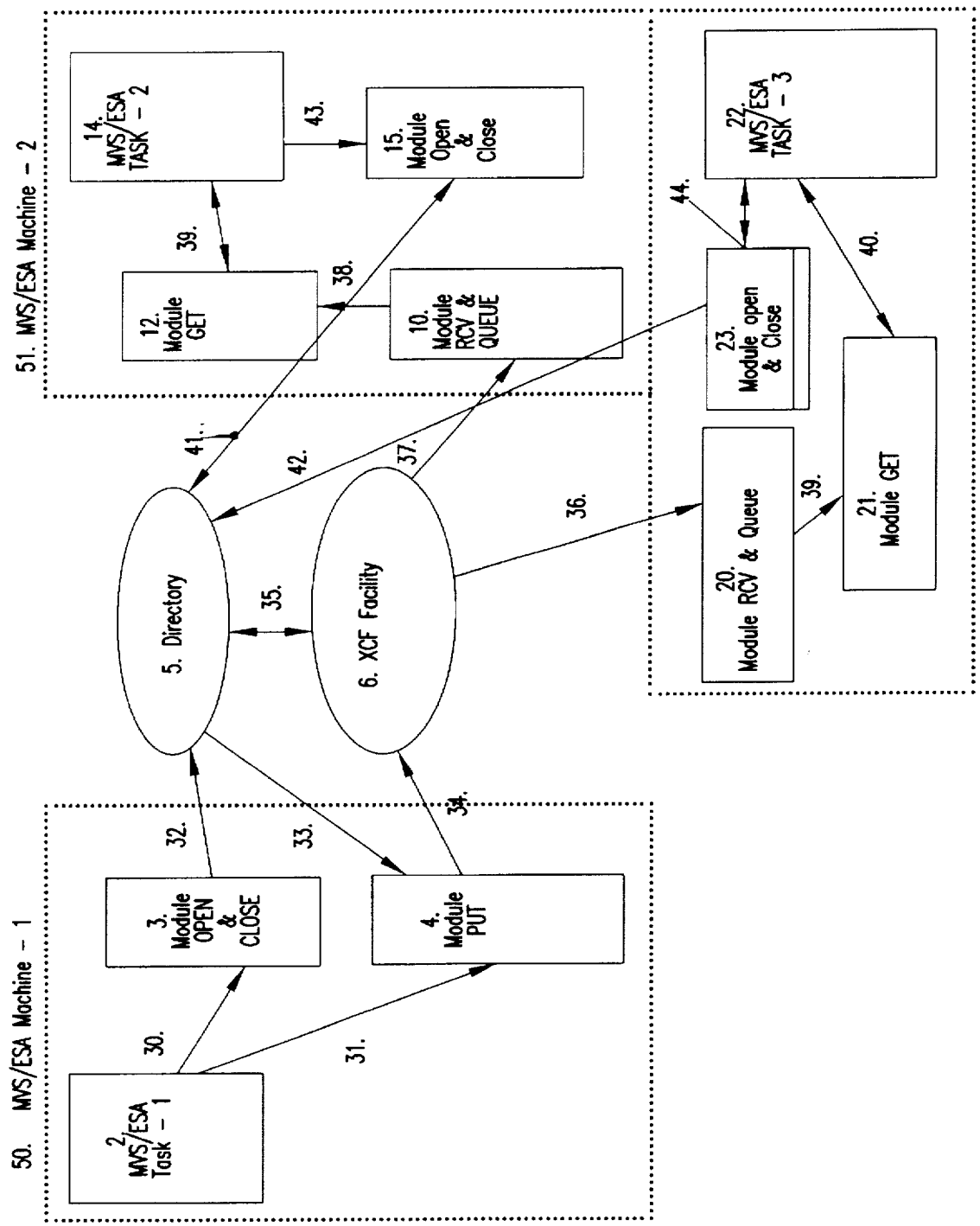
FIG. 1. Is a block diagram of a portion of two MVS/ESA operating systems using the XCF facility for message transport between tasks on the same physical machine and on different physical machines.

Referring now to FIG 1., MVS/ESA physical machine (50) includes software components 2, 3 and 4 that are responsible for establishing message communications with an MVS/ESA XCF facility 6 residing somewhere in the MVS/ESA environment. MVS/ESA physical machine (51) includes a set of software components 10, 12, 14, 15 and a second set 20, 21,22 and 23 for establishing communications with the same MVS/ESA XCF facility 6 in the MVS/ESA environment.

MVS/ESA task—1 (2) initiates a request to send a message to one or more named tasks that have interest in receiving messages by registering the name of this named task in software directory 5. (A named task is the name of a Group comprised of one or more tasks that can have access to messages.) To accomplish this, MVS/ESA task—1 (2) calls program module 3 (Open & Close) via 30. Program 3 (Open & Close) will place the name of this named task into directory 5 via 32. Program 3 (Open & Close) also describes itself in detail in the directory and that will be used later by any other named tasks that have interest.

MVS/ESA task—2 (14) initiates a request to receive messages from one or more named tasks that have interest in sending messages by registering the name of this named task in directory 5 via 41. To accomplish this, MVS/ESA task—2 (14) calls program module 15 (Open & Close) via path 43. Program 15 (Open & Close) will place the name of this named task into directory 5 via 41. Program 15 (Open & Close) also describes itself in detail in the directory and that will be used later by any other named tasks that have interest. In addition, MVS/ESA task—3 (22) initiates a request to receive messages from one or more named tasks that have interest in sending messages by registering the name of this named task in directory 5. To accomplish this, MVS/ESA task—3 (22) calls program module 23 (Open & Close) via path 44. Program 23 (Open & Close) will place the name of this named task into directory 5 via 42. Program 23 (Open & Close) also describes itself in detail in the directory and that will be used later by any other named tasks that have interest.

A message is initiated from MVS/ESA task—1 (2) by calling software program 4 (Module Put) via 31 using the name of a registered named task as the destination of the message. Program 4 (Module Put) requests a list of already registered named tasks from directory 5 via 33. Program 4 (Module Put) interrogates this list of named tasks until all the tasks with the same name as the destination are found. For each task in the list, program 4 (Module Put) will send a copy of the message to 6 (XCF Facility) via 34 naming the final named task destination. As an option the function of program 4 (Module Put) can be limited to only send to the first named task found in task list provided by directory 5. In either case, when all messages are sent, program control is returned to MVS/ESA task—1 (2) without requiring it to wait for any confirmation that the messages arrived at their final destination.

Once the message arrives at 6 (XCF Facility) via 34 this facility uses internal high speed IBM facilities to locate and send the message to the named task named by program 4 (Module Put). The message leaves 6 (XCF Facility) via 37 and is received by program 10 (Module RCV & Queue) located on 51 (MVS/ESA Machine—2). Once the message is received by 10 (Module RCV & Queue) it is put on a queue located in 14 (MVS/ESA task—2) where it can be looked at when 14 (MVS/ESA task—2) is ready to process it. Messages can be delivered to program 10 (Module RCV & Queue) without 14 (MVS/ESA task—2) explicitly waiting for them. If 14 (MVS/ESA task—2) is not currently waiting for a message then program 10 (Module RCV & Queue) will place the message on a software queue where it can be looked at by 14 (MVS/ESA task—2) at a later time. Hence, no waiting is required by 14 (MVS/ESA task—2). In addition, if MVS/ESA task—3 (22) has also registered in directory 5 with a task name equal to that of MVS/ESA task—2 (14) then a second copy of the message leaves 6 (XCF Facility) via 36 and is received by program 20 (Module RCV & Queue) located on 51 (MVS/ESA Machine—2). Once the message is received by 20 (Module RCV & Queue) it is put on a queue located in 22 (MVS/ESA task—3) where it can be looked at when 22 (MVS/ESA task—3) is ready to get it. Messages can be delivered to program 20 (Module RCV & Queue) without 22 (MVS/ESA task—3) explicitly waiting for them. If 22 (MVS/ESA task—3) is not currently waiting for a message then program 20 (Module RCV & Queue) will place the message on a software queue where it can be looked at by 22 (MVS/ESA task—3) at a later time. Hence, no waiting is required by 22 (MVS/ESA task—3) as well.

Once MVS/ESA task—2 (14) is ready to process messages sent to it by other named tasks a call is made to program 12 (Module Get) via 39. Module Get (12) will look at the software queue located in MVS/ESA task—2 (14) to see if any messages were queued to it by 10 (Module RCV & Queue) sometime in the past. If messages were found then the first message is removed from the queue and copied to 14 (MVS/ESA task—2) via 39. If no messages were found on the queue then 12 (Module Get) will issue an explicit MVS Wait which will put MVS/ESA task—2 (14) to sleep and program 10 (Module RCV & Queueu) will be responsible for waking up MVS/ESA task—2 (14) via 10 (Module Get) when 6 (XCF Facility) sends a message via 37. Eventually, program 10 (Module RCV & Queue) receives a message via 37 and wakes program 12 (Module Get). Program 12 (Module Get) wakes up MVS/ESA task—2 (14) and processing continues by making a copy of the message and passing it to MVS/ESA task—2 (14) via 39. In addition, Once MVS/ESA task—3 (22) is ready to process messages sent to it by other named tasks a call is made to program 21 (Module Get) via 40. Module Get (21) will look at the software queue located in MVS/ESA task—3 (22) to see if any messages were queued to it by 20 (Module RCV & Queue) sometime in the past. If messages were found then the first message is removed from the queue and copied to 22 (MVS/ESA task—3) via 40. If no messages were found on the queue then 21 (Module Get) will issue an explicit MVS Wait which will put MVS/ESA task—3 (22) to sleep and program 20 (Module RCV & Queueu) will be responsible for waking up MVS/ESA task—3 (22) via 20 (Module Get) when 6 (XCF Facility) sends a message via 36. Eventually, program 20 (Module RCV & Queue) receives a message via 36 and wakes program 21 (Module Get). Program 21 (Module Get) wakes up MVS/ESA task—3 (22) and processing continues by making a copy of the message and passing it to MVS/ESA task—3 (22) via 44.

Once MVS/ESA task—2 (14) no longer wishes to process messages from a named task, program 15 (Module Open & Close) is called with this tasks named task as can be found in directory 5. Program 15 (Module Open & Close) will remove the name of this named task from directory 5 via 41. No longer will MVS/ESA task—1 (2) program 4 (Module Put) be able to find an entry for MVS/ESA task—2 (14) in directory 5 and no messages will be sent to 10 (MVS/ESA task—2). In addition, Once MVS/ESA task—3 (22) no longer wishes to receive messages from a named task, program 23 (Module Open & Close) is called with this tasks named task as can be found in directory 5. Program 23 (Module Open & Close) will remove the name of this named task from directory 5 via 42. No longer will MVS/ESA task—1 (2) program 4 (Module Put) be able to find an entry for MVS/ESA task—3 (22) in directory 5 and no messages will be sent to 20 (MVS/ESA task—2).

I claim:

1. An MVS/ESA computer facility, comprising:
   an MVS/ESA operating system including a plurality of MVS tasks and a XCF facility;
   means for registering in a directory a request to send messages from one or more tasks to one or more groups;
   means for registering in a directory a request to receive messages from one or more tasks from one or more groups;
   means for receiving a message from a first MVS task designating a group and selecting one or more eligible tasks from the group for receiving the message;
   means for sending the message through the XCF facility to each selected eligible task; and
   receiving means in each selected eligible task for;
   (a) asynchronously receiving the message at the selected eligible task from the first MVS task through the XCF facility;
   (b) asynchronously queuing any message received for that selected eligible task; and
   (c) notifying the selected eligible task that a message has arrived and, when the selected eligible task is sleeping while waiting for a message, awakening the sleeping task.

2. The MVS/ESA computer facility as claimed in claim 1 wherein more than one task is registered with a same name in the directory and wherein the means for sending the message further comprises:
   means for sending the message to each selected eligible task with the same name whereby the message is mirrored to more than one selected eligible task.

3. The MVS/ESA computer facility as claimed in claim 1 wherein more than one task is registered with a same name in the directory and wherein the means for sending the message further comprises:
   means for sending the message to a first named task in the directory, whereby the message is only sent to one selected eligible task, until the first named task terminates.

4. The MVS/ESA computer facility as claimed in claim 3 further comprising means for, when the first named task terminates, sending the message to a next named task in the directory until the next named task terminates.

5. The MVS/ESA computer facility as claimed in claim 1 further comprising means for removing request from the directory from inactive tasks.

6. A method for sending messages in a MVS/ESA computer facility having an MVS/ESA operating system including a plurality of MVS tasks and a XCF facility, comprising the steps of:
   registering in a directory a request to send messages from one or more tasks to one or more groups;
   registering in a directory a request to receive messages from one or more tasks from one or more groups;
   receiving a message from a first task designating a group and selecting one or more eligible tasks from the group for receiving the message;
   sending the message through the XCF facility to each selected eligible task; and
   at each selected eligible task,
   (a) asynchronously receiving the message at the selected eligible task from the first MVS task through the XCF facility;
   (b) asynchronously queuing any message received for that selected eligible task; and
   (c) notifying the selected eligible task that a message has arrived and, when the selected eligible task is sleeping while waiting for a message, awakening the sleeping task.

7. The method as claimed in claim 6 wherein more than one task is registered with a same name in the directory and wherein the step of sending the message further comprises sending the message to each selected eligible task with the same name, whereby the message is mirrored to more than one selected eligible task.

8. The method as claimed in claim 6 wherein more than one task is registered with a same name in the directory and wherein the step of sending the message further comprises the step of sending the message to a first named task in the directory, whereby the message is only sent to one selected eligible task, until the first named task terminates.

9. The method as claimed in claim 8 further comprising the step of, when the first named task terminates, sending the message to a next named task in the directory until the next named task terminates.

10. The method as claimed in claim 6 further comprising the step of removing requests from the directory from inactive tasks.

11. An article of manufacture comprising a program storage medium readable by a computer and embodying one or more instructions executable by the computer to perform method steps for send messages in a MVS/ESA computer facility having an MVS/ESA operating system including a plurality of MVS tasks and a XCF facility, the method comprising the steps of:

registering in a directory a request to send messages from one or more tasks to one or more groups;

registering in a directory a request to receive messages from one or more tasks from one or more groups;

receiving a message from a first MVS task designating a group and selecting, one or more eligible tasks from the group for receiving the message;

sending the message through the XCF facility to each selected eligible task; and at each selected eligible task, (a) asynchronously receiving the message at the selected eligible task from the first MVS task through the XCF facility;

(b) asynchronously queuing any message received for that selected eligible task; and (c) notifying the selected eligible task that a message has arrived and, when the selected eligible task is sleeping while waiting for a message, awakening the sleeping task.

12. The method as claimed in claim 11 wherein more than one task is registered with a same name in the directory and wherein the step of sending the message further comprises sending the message to each selected eligible task with the same name, whereby the message is mirrored to more than one eligible task.

13. The method as claimed in claim 11 wherein more than one task is registered with a same name in the directory and wherein the step of sending the message further comprises the step of sending the message to a first named task in the directory, whereby the message is only sent to one selected eligible task, until the first named task terminates.

14. The method as claimed in claim 13 further comprising the step of, when the first named task terminates, sending the message to a next named task in the directory until the next named task terminates.

15. The method as claimed in claim 11 further comprising the step of removing requests from the directory from inactive tasks.

* * * * *